(12) United States Patent
Eberhard

(10) Patent No.: US 8,055,760 B1
(45) Date of Patent: Nov. 8, 2011

(54) FIREWALL DOCTOR

(75) Inventor: Timothy L. Eberhard, Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 624 days.

(21) Appl. No.: 11/612,085

(22) Filed: Dec. 18, 2006

(51) Int. Cl.
*G06F 15/173* (2006.01)

(52) U.S. Cl. ...................................... 709/224

(58) Field of Classification Search .......... 709/223–225; 340/3.1–3.9; 370/252; 702/109
See application file for complete search history.

(56) References Cited

U.S. PATENT DOCUMENTS

| | | | | |
|---|---|---|---|---|
| 6,115,393 | A * | 9/2000 | Engel et al. | 370/469 |
| 6,484,261 | B1 * | 11/2002 | Wiegel | 726/11 |
| 7,146,639 | B2 * | 12/2006 | Bartal et al. | 726/11 |
| 7,237,258 | B1 * | 6/2007 | Pantuso et al. | 726/11 |
| 2002/0052941 | A1 * | 5/2002 | Patterson | 709/223 |
| 2005/0015624 | A1 * | 1/2005 | Ginter et al. | 713/201 |
| 2006/0143699 | A1 * | 6/2006 | Nagata et al. | 726/11 |
| 2006/0179432 | A1 * | 8/2006 | Walinga et al. | 717/171 |

OTHER PUBLICATIONS

IBM, "Design for a Simple Network Management Protocol Subagent for Internet Firewalls" IBM Technical Disclosure Bulletin, IBM Corp. New York, US, vol. 40, No. 3, Mar. 1, 1997.*
Cisco, "Basic Dial NMS Implementation Guide", Aug. 2000, retrieved from http://www.cisco.com/en/US/docs/ios/internetwrk_solutions_guides/splob/guides/dial/dial_nms/dnmsbk.pdf on Nov. 4, 2009.*
Cisco, Monitoring Cistco IOS Firewall Inspection Activity with Multi-Router Traffic Grapher (MRTG), 2007, retrieved from http://www.ciscosystems.ch/en/US/prod/collateral/vpndevc/ps5708/ps5710/ps1018/prod_white_paper0900aecd8064c888.pdf on Nov. 4, 2009.*
Juniper Networks, "NetScreen Concepts & Examples, Screen OS Reference Guide", 2004, retrieved from http://www.juniper.net/techpubs/software/screenos/screenos5.1.0/ on Aug. 31, 2010.*
Cisco, "Cisco IOS Firewall MIB", Feb. 27, 2006, retrieved from http://www.cisco.com/en/US/docs/ios/12_4t/12_4t11/ht_fwmib.html on Aug. 31, 2010.*
Welcher, "Managing a Cisco PIX with PDM", Feb. 6, 2004, retrieved from http://www.netcraftsmen.net/resources/archived-articles/377.html on Feb. 8, 2011.*

* cited by examiner

*Primary Examiner* — Joon H Hwang
*Assistant Examiner* — Thomas Lee, IV

(57) ABSTRACT

A method, system, and computer-readable media are provided for performing a status check on a firewall. The computer-readable media may perform a method that includes receiving a request from a requester for a status check of a firewall. The method may further include creating a connection to the firewall for accessing the firewall, and determining a plurality of status parameters for the status check such that at least one status parameter is calculated from information stored within the firewall. Additionally, the method can include providing the plurality of status parameters to be displayed to the requester.

12 Claims, 5 Drawing Sheets

FIREWALL DOCTOR

INTRODUCTION

Many problems associated with network devices within a network may arise that will need to be solved by a network support group. Typically, there are several support levels within a network support group. When there is an issue with a network device, a first-tier support group may be initially contacted in order to remedy any problems or issues with the network or any devices within the network. The first-tier group may include, for example, individuals that are part of a initial call center. The first-tier group may have a general knowledge of common problems that arise within the network. However, there may be issues with the network that individuals of the first-tier support group are unfamiliar with or do not know to fix.

When such issues arise, the first-tier support group may need to contact an upper level of support such as a second, third, fourth, etc., tier support group, that can include individuals with more experience and expertise for addressing complex and uncommon network issues. However, going through a method of contacting multiple upper-tiers of support groups for diagnosing and fixing network problems may prove to be a laborious process that can be time-consuming.

Conventionally, one technique that has been implemented in helping diagnose problems with network devices is alarming. Alarming generally involves sending an alarm, in the form of an email for example, to one or more individuals within a network support group when a problem arises with a network device. In alarming, one or more system parameters of a network device may be monitored, and an alarm can be sent out when it is detected that a system parameter reaches, exceeds, or falls below a certain threshold value. However, one problem with alarming is that a false-positive alarm may be generated that when analyzed does not show an actual problem with a network device. Another problem with alarming is that an alarm does not provide any requested information regarding the status of a network device on-demand, but rather an alarm only gives information of one particular aspect of the network device that appears to have a problem. Therefore, there exists a need for a system and method that will enable all levels of a network support group to quickly obtain information on-demand regarding the overall status of a network device.

SUMMARY

The presenting invention is defined by the claims below. Embodiments of the present invention solve at least the above problems by providing a system and method for, among other things, performing a status check on a firewall.

In a first aspect, computer-readable media having computer-useable instructions embodied thereon are provided for executing a method of performing a status check on a firewall. The method includes receiving a request from a requester for a status check of a firewall. The request may include at least one firewall identifier that identifies the firewall to be subject to the status check. The method further includes creating a connection to the firewall for accessing the firewall. Moreover, the method includes determining a plurality of status parameters for the status check, wherein at least one status parameter is calculated from information stored within the firewall. Additionally, the method can include providing the plurality of status parameters to be displayed to the requester, wherein the plurality of status parameters are results of the status check.

In another aspect, computer-readable media having computer-useable instructions embodied thereon are provided for executing an additional method of performing a status check on a firewall. The method can include receiving at least one firewall identifier that identifies a firewall being subject to a status check. The method further includes receiving a selection of a plurality of status parameters for the status check. Moreover, the method includes creating a connection to the firewall to access the firewall. Additionally, the method includes retrieving the plurality of status parameters, wherein at least one status parameter is calculated from information stored within the firewall. Furthermore, the method includes providing the requested plurality of status parameters to be displayed to the requester, wherein the plurality of status parameters are results of the status check.

In yet another aspect, a graphical user interface embodied on one or more computer-readable media and executable on a computer is provided for presenting on a display screen one or more status parameters of a status check of a firewall. The graphical user interface may comprise a first screen area configured to receive an input of an identifier that identifies the firewall having the status check. The graphical user interface may additionally comprise a second screen area configured to allow a user to select which status parameters that the user would like to view for the firewall. Additionally, the graphical user interface may comprise a third screen area configured to display one or more status parameters from the requested firewall.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2 is table illustrating an exemplary one-minute counter for the session build rate status parameter.

DETAILED DESCRIPTION

Further, various technical terms are used throughout this description. A definition of such terms can be found in *Newton's Telecom Dictionary* by H. Newton, 22$^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include RAM, ROM, EEPROM, flash memory or other memory technology, CD-ROM, digital versatile discs (DVD), magnetic cassettes, magnetic tape, magnetic disk storage, and other magnetic storage devices.

Figure 1:
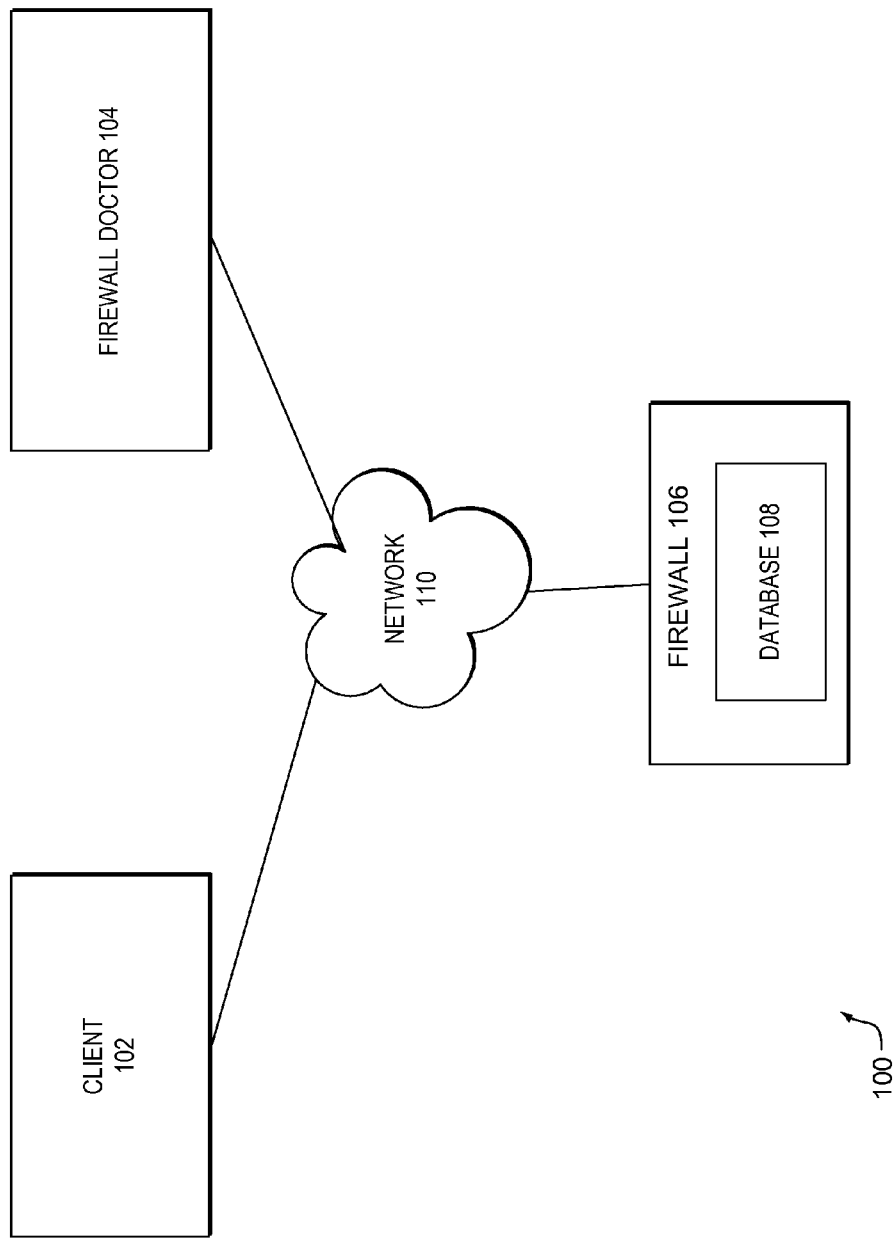
FIG. 1 is a block diagram of a system for implementing the invention.

FIG. 1 is a block diagram of a system for implementing the invention. The system includes client 102, firewall doctor 104, firewall 106, and network 110. Client 102 may be or can include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device.

Client 102 may also be or can include a server such as a workstation running a version of the Microsoft Windows® operating system, MacOS™, Unix, Linux, Xenix, IBM AIX™, Hewlett-Packard UX™, Novell Netware™, Sun Microsystems Solaris™ OS/2™ BeOS™, Mach, Apache, OpenStep™ or other operating system or platform.

Client 102 can include a communication interface. The communication interface may be an interface that can allow the client to be directly connected to any other device or allows the client 102 to be connected to a device over network 110. Network 110 can include, for example, a local area network (LAN), a wide area network (WAN), or the Internet. In an embodiment, the client 102 can be connected to another device via a wireless interface through a wireless network 110.

A user may use client 102 to request a status check of one or more firewalls 106. The request may be transmitted to the firewall doctor 104 so that the firewall doctor can perform the status check on the firewall 106. Firewall doctor 104 may be or can include a server such as a workstation running a version of the Microsoft Windows® operating system, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

The request received by the firewall doctor 104 can include an identifier that identifies the firewall 106 that is to be examined. The identifier may be, for example, an Internet Protocol (IP) address, a Short Name, or a Hostname of the firewall 106. Once the firewall doctor 104 receives the identifier, the firewall doctor can open a secure connection with the requested firewall 106 and can proceed to issue a series of commands for checking the current status of the firewall 106.

The status check may comprise examining database 108 in order to determine one or more status parameters. The database 108 can store information about the history of the performance of the firewall. In embodiments, the database can be configured to store performance history up to any desired time interval including a given number of seconds, minutes, hours, days, weeks, months, or years. This performance history information can be used by the firewall doctor 104 to generate the status parameters that are to be determined for the status check. In an embodiment, the information stored in the database 108 may already comprise one or more status parameters within the performance history without the need of the firewall doctor 104 to calculate the status parameters. In an embodiment, the particular status parameters determined by the firewall doctor 104 may specified by the user within the request. In another embodiment, the status parameters that comprise the status check may be predetermined by the firewall doctor.

One status parameter that may be determined by the firewall doctor 104 is the usage of the firewall's Control Processing Unit (CPU). The CPU usage may be useful to know as a high CPU usage, for example, may lead to network traffic being dropped or other problematic issues. Another status parameter that may be determined by the firewall doctor 104 is the firewall's session usage. A session is any type of connection through the firewall 106 that is allowed by the firewall 106. For example, a session can be established when a user accesses a webpage through the firewall 106. A determination of session usage details the number of sessions the firewall currently has. The session usage may be useful to know as a high number of session may be problematic. Another status parameter that may be determined by the firewall doctor 104 is the firewall's session build rate. The session build rate details how many sessions the firewall 106 builds in a given time frame. The rate can be, for example, the number of sessions created per second. Yet another status parameter that may be determined by the firewall doctor 104 is the firewall's interface status. The interface status parameter details the physical and logical connections managed by the firewall 106. Each connection may be checked to discover status identifiers that identify whether the connections are active (working), deactive (down/not working), inactive (not being used), or if there are any errors associated with the connection. Another status parameter that may be determined by the firewall doctor 104 is the firewall's uptime. The uptime details when the firewall 106 was last rebooted.

Yet another status parameter that may be determined by the firewall doctor 104 is the firewall's Net Screen Redundancy Protocol (NSRP) status. When a firewall is placed in a high redundancy environment, the firewall may be placed in sync with one or more other firewalls. The firewalls periodically communicate to each other and monitor each other so that if one crashes or has any other problematic issues, another firewall takes over immediately. The NSRP status parameter provides many details such as, but not limited to, whether the connected firewalls are in sync, whether the connection between the firewalls is sufficient, whether the firewalls are communicating with each other, and which firewall is currently active.

In an embodiment, the CPU usage, session usage, and session build rate are status parameters that the firewall doctor 104 has to calculate based on information stored in database 108. In such an embodiment, for each of these status parameters there can be a plurality of one-minute counters located within database 108. FIG. 2 is table 200 illustrating an exemplary one-minute counter for the session build rate status parameter. Row 202 contains fields for the first six seconds of the counter. Each field details the number of sessions that were created within the corresponding second. The first field "0" shows that 2,770 sessions were created during the first second. The next field "1" shows that 2,431 sessions were created during the next second. The fields within the table continue in numeric order corresponding to the seconds passed in time as represented in rows 204, 206, 208, 210, 212, 214, 216, 218, and 220, wherein row 220 shows the number of sessions created by the firewall for each the last 6 seconds of the one-minute counter.

The session build rate may be calculated over any unit of time. In the preferred embodiment, the units for the session build rate is sessions per sec (sessions/sec). Moreover, the session build rate can be averaged for any number of time intervals from when a request is received by the firewall doctor 104. In the preferred embodiment, the firewall doctor 104 calculates the session build rate for the past 1 minute, 5 minutes, and 15 minutes from when a status check request is received. For example, if table 200 represents a one-minute counter for the past minute from when a session build rate status request was received, the firewall doctor would sum fields 0-59 and divide by 60 to get the session build rate for the past minute. To determine the session build rate for the past 5 minutes, the firewall doctor would sum all fields from the previous 5 one-minute counters from when the request was received and divide by 300. To determine the session build rate for the past 15 minutes, the firewall doctor would sum all fields from the previous 15 one-minute counters from when the request was received and divide by 900.

When calculating the session usage, the firewall doctor can take the summation of all fields of a one-minute counter as shown in FIG. 2 for any given time interval from when a session usage status request is received. For example, to determine the session usage for the past minute, the firewall doctor 104 would sum all fields from the previous one-minute counter from when the request was received. To determine the session usage for the past 5 minutes, the firewall doctor would sum all fields from the previous 5 one-minute counters from when the request was received. To determine the session usage for the past 15 minutes, the firewall doctor would sum all fields from the previous 15 one-minute counters from when the request was received.

When calculating the CPU usage, there can be similar one-minute counters that store the firewall's CPU usage for each second. Each field stores the firewall's percentage of CPU usage for each passed second. To determine the CPU usage for the past minute, the firewall doctor would sum all fields from the previous one-minute counter from when the request was received and divide the sum by 60. To determine the CPU usage for the past 5 minutes, the firewall doctor would sum all fields from the previous 5 one-minute counters from when the request was received and divide the sum by 300. To determine the CPU usage for the past 15 minutes, the firewall doctor would sum all fields from the previous 15 one-minute counters from when the request was received and divide the sum by 900.

Figure 3:
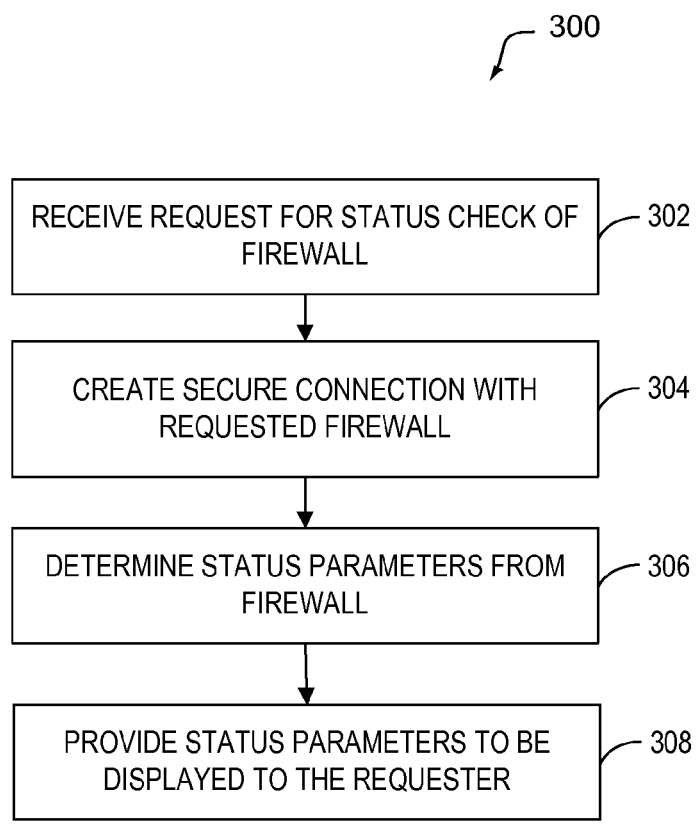
FIG. 3 is a flow diagram of an exemplary method 300 for performing a status check on a firewall.

FIG. 3 is a flow diagram of an exemplary method 300 for performing a status check on a firewall. At operation 302, a request is received for the performance of a status check on a particular firewall. Within the request, an identifier identifying the particular firewall is received as well. The identifier may be, for example, an IP address, a Short Name, or a Hostname of the firewall. In an embodiment, the request may also include an identification of the particular status parameters that the requester would like to receive. The request may be received, for example, by a firewall doctor. At operation 304, a secure connection is created to the requested firewall. The firewall doctor, for example, may create the secure connection. At operation 306, one or more status parameters are determined. In an embodiment of determining the status parameters, the firewall doctor may retrieve one or more requested status parameters, or one or more status parameters that are predetermined by the firewall doctor, from the firewall. In another embodiment of determining the status parameters, the firewall doctor may calculate one or more status parameters from information stored within the firewall's database. The information may be, in one example, data stored in one-minute counters. At operation 308, the determined status parameters are provided to be displayed in a GUI to the requester, wherein the provided status parameters are the results of the status check.

Figure 4:
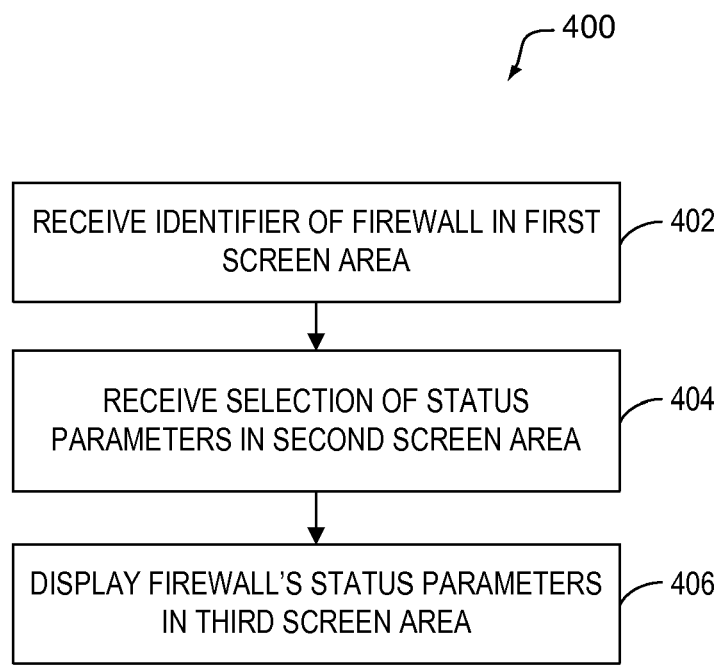
FIG. 4 is a flow diagram of an exemplary method 400 for performing a status check on a firewall within a GUI.

FIG. 4 is a flow diagram of an exemplary method 400 for performing a status check on a firewall within a GUI. At operation 402, an identifier of the requested firewall having the status check is received at a first screen area. The identifier may be, for example, an IP address, a Short Name, or a Hostname of the firewall. At operation 404, a selection of one or more status parameters is received at a second screen area. At operation 406, the requested firewall's status parameters are displayed in a third screen area.

Figure 5:
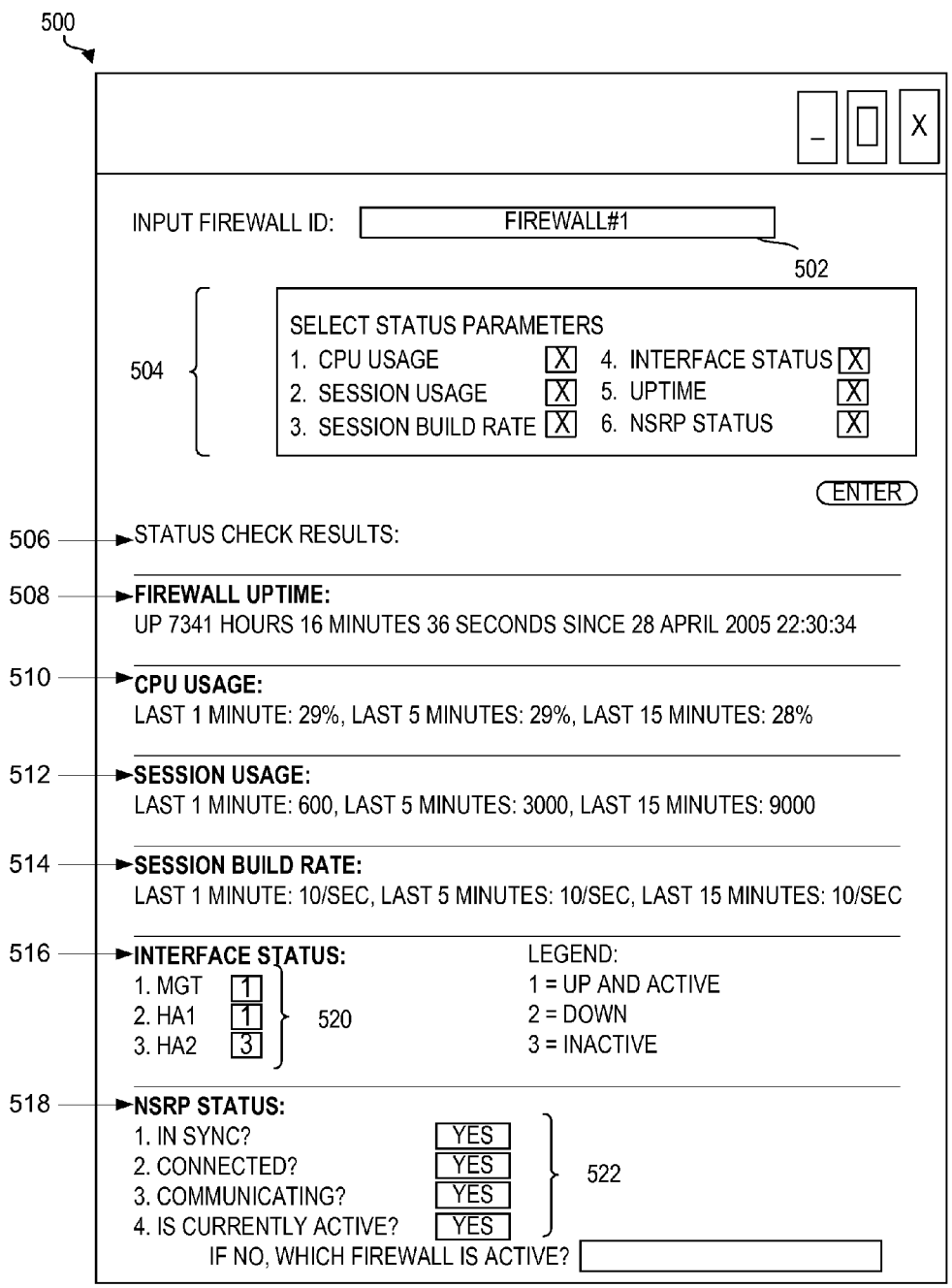
FIG. 5 is an exemplary GUI for performing a status check on a firewall.

FIG. 5 is an exemplary GUI 500 for performing a status check on a firewall. GUI 500 can include a first screen area 502 that is be configured to receive an input of an identifier that identifies the requested firewall having the status check. The identifier may be, for example, an IP address, a Short Name, or a Hostname of the firewall. GUI 500 can include a second screen area 504 that is configured to allow a user to select which status parameters that he/she would like to view for the requested firewall. In an embodiment, the user can select one or more status parameters including a CPU usage parameter, a session usage parameter, a session build rate parameter, an interface status parameter, an uptime parameter, and an NSRP parameter. GUI 500 can also include a third screen area 506 that is configured to display one or more status parameters from the requested firewall. In an embodiment, the one or more status parameters displayed in screen area 506 correspond to status parameters selected in screen area 504. In another embodiment, the particular status parameters displayed in screen area 506 are determined by the firewall doctor. In such an embodiment, a developer or administrator can configure the firewall doctor to provide particular status parameters. Screen area 506 may be divided into one or more sub-screen areas for displaying the one or more status parameters from the requested firewall. Sub-screen areas 508, 510, 512, 514, 516, and 518 are examples of sub-screen areas for displaying six different status parameters. Sub-screen area 508 displays the firewall uptime status parameter, sub-screen area 510 displays the CPU usage status parameter, sub-area 512 displays the session usage status parameter, sub-area 514 displays the session build rate status parameter, sub-area 516 displays the interface status parameter, and sub-screen 518 displays the NSRP status parameter. In an embodiment, the interface and NSRP status parameters may additionally include one or more sets of status identifiers 520 and 522 respectively for one or more features of each parameter. For the interface status parameter, the one or more features can include the different physical and/or logical connections managed by the firewall. For the NSRP status parameter, the one or more features can include categories of information related to the other connected firewalls.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions executable by one or more computing devices for performing a method of performing a status check on a firewall, the method comprising:
   receiving a request from a client for a status check of a firewall, the request including at least one firewall identifier identifying the firewall to be subject to the status check, wherein the request includes an internet protocol (IP) address, a Short Name, or a Hostname of the firewall;
   creating a connection to the firewall in order to access the firewall, wherein creating the connection to the firewall comprises opening a secure connection with the firewall;
   issuing a set of commands to the firewall to perform the status check of the firewall;
   determining a plurality of status parameters for the status check, wherein determining the plurality of status parameters comprises at least one of examining a database, in the firewall, said database storing performance history to determine the plurality of status parameters and generating the plurality of status parameters, wherein at least one status parameter is calculated from information stored within the firewall, and wherein the plurality of status parameters includes a usage of the control processing unit of the firewall, a session usage of the firewall, a session build rate of the firewall, an interface status of the firewall, an uptime of the firewall, and a net screen redundancy protocol (NSRP) status of the firewall; and
   providing the plurality of status parameters to be displayed to the client, wherein the plurality of status parameters are results of the status check.

2. The media according to claim 1, further comprising providing a status identifier with at least one of the plurality of status parameters to be presented on a display device.

3. The media according to claim 1, wherein the information stored with the firewall comprises data stored in one or more counters, the one or more counters containing statistics covering 60 one-second intervals.

4. The media according to claim 3, wherein the at least one status parameter calculated from information stored with the firewall is a control processing unit usage status parameter and the statistics correspond to a percentage of control processing unit usage per second.

5. The media according to claim 4, wherein the control processing unit usage status parameter is calculated for the past 1 minute, 5 minutes, and 15 minutes from when the request is received.

6. The media according to claim 3, wherein the at least one status parameter calculated from information stored with the firewall is a session build rate status parameter and the statistics correspond to a number sessions created by the firewall per second.

7. The media according to claim 6, wherein the session build rate status parameter is calculated for the past 1 minute, 5 minutes, and 15 minutes from when the request is received.

8. The media according to claim 3, wherein the at least one status parameter calculated from information stored with the firewall is a session usage status parameter and the statistics correspond to a number sessions created by the firewall per second.

9. The media according to claim 8, wherein the session usage status parameter is calculated for the past 1 minute, 5 minutes, and 15 minutes from when the request is received.

10. One or more non-transitory computer-readable media having computer-useable instructions executable by one or more computing devices for executing a method of performing a status check on a firewall, the method comprising:
    receiving at least one firewall identifier identifying a firewall being subject to a status check, wherein the at least one firewall identifier includes an internet protocol (IP) address, a Short Name, or a Hostname of the firewall;
    receiving a selection of a plurality of status parameters from a user for the status check;
    creating a connection to the firewall in order to access the firewall, wherein creating the connection to the firewall comprises opening a secure connection with the firewall;
    issuing a set of commands to the firewall to perform the status check of the firewall;
    retrieving the plurality of status parameters, wherein at least one status parameter is calculated from information stored within a database in the firewall, the database storing performance history; and
    providing the plurality of status parameters to be displayed to a client, wherein the plurality of status parameters are results of the status check, and wherein the plurality of status parameters includes a usage of the control processing unit of the firewall, a session usage of the firewall, a session build rate of the firewall, an interface status of the firewall, an uptime of the firewall, and a net screen redundancy protocol (NSRP) status of the firewall.

11. The media according to claim 10, wherein the information stored with the firewall comprises data stored in one or more counters, the one or more counters containing statistics covering 60 one-second intervals.

12. The media according to claim 11, further comprising providing a status identifier with at least one of the plurality of status parameters to be displayed to the client.

* * * * *